April 6, 1937. W. B. GOODMAN ET AL 2,076,232
ENGINE COWLING AND COOLING
Filed June 11, 1935
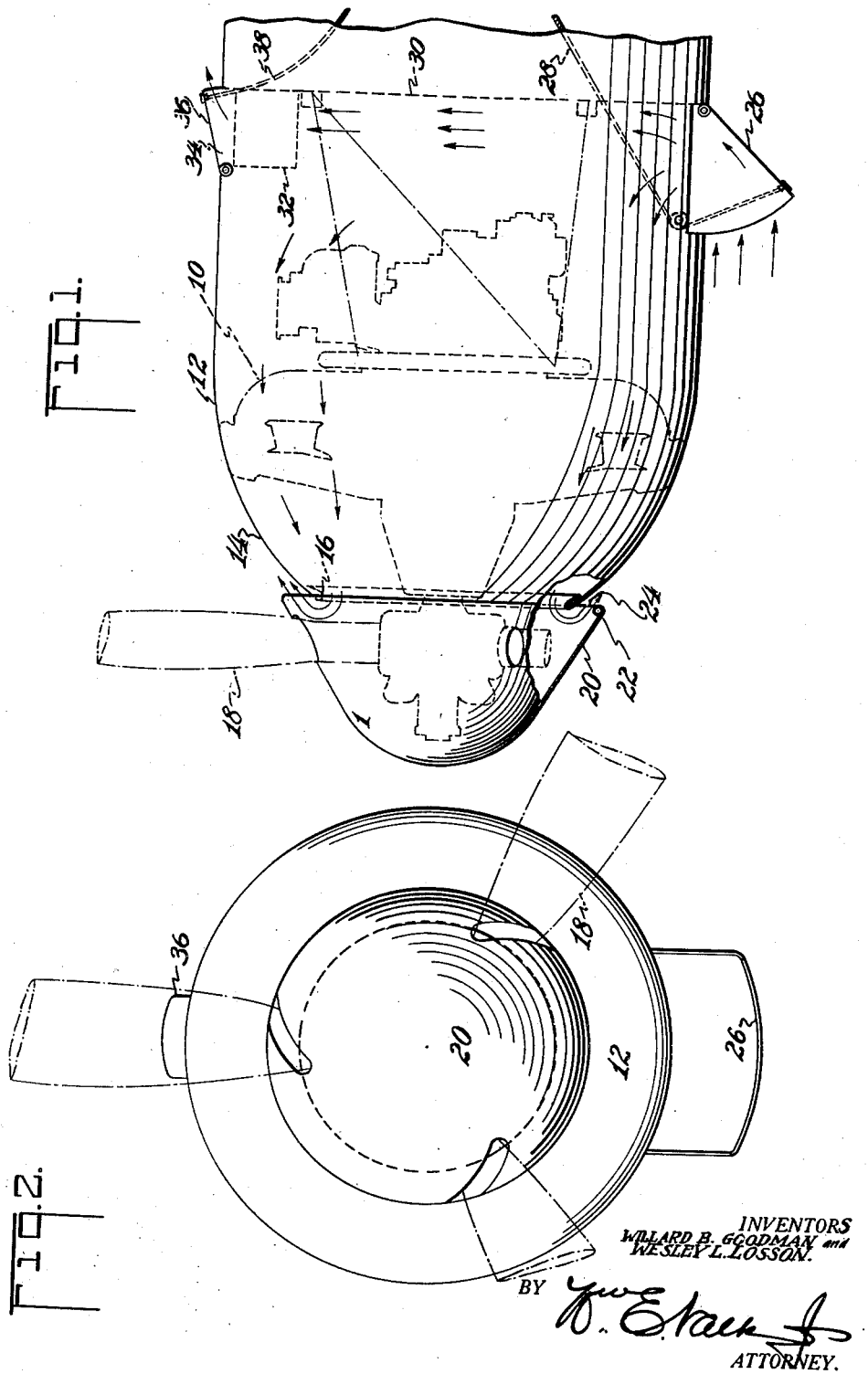
INVENTORS
WILLARD B. GOODMAN and
WESLEY L. LOSSON.
BY
ATTORNEY.

Patented Apr. 6, 1937

2,076,232

UNITED STATES PATENT OFFICE 2,076,232

ENGINE COWLING AND COOLING

Willard B. Goodman and Wesley L. Losson, Passaic, N. J., assignors to Wright Aeronautical Corporation, a corporation of New York Application June 11, 1935, Serial No. 25,983

4 Claims. (Cl. 123—171)

This invention relates to aircraft power plants, and is particularly concerned with improvements in cowling means for directing cooling air flow over an air-cooled radial engine.

Objects of the invention are to provide a cowling means permitting of the optimum streamline form of the nose end of a fuselage, while providing for an adequate cooling air flow over an engine enclosed within the cowling.

A further object is to provide means for regulating the cooling air flow over the engine.

Still another object is to provide adjustable air cooling means for a power plant auxiliary.

Still another object is to augment the cooling air flow over an engine by virtue of the placement of the cooling air exit in a region of low pressure adjacent the fuselage nose.

In the drawing, in which similar numbers indicate similar parts:

Fig. 1 is a side elevation of the forward end of an airplane, showing the engine and associated parts in dotted lines; and Fig. 2 is a front elevation of the fuselage.

In the drawing, an air-cooled radial engine of well known form is indicated at 10, this engine being completely enclosed in a cowling 12 contracted at its forward end to form an ogive 14 open at its forward end as at 16 to provide an air exit opening. The engine carries a propeller 18, the hub of which is embraced by a spinner 20 of more or less hemispherical form. The rearward edge 22 of the spinner lies rearwardly of the forward edge 16 of the cowling 12, and is radially spaced therefrom, to provide a rearwardly facing air exit annulus 24. Toward the rearward part of the cowling, a forwardly facing air scoop 26 is arranged, this scoop being adjustable by means of a Bowden control or the like 28, so that the scoop may be adjusted out from the cowling to entrain air or held closely thereto to lessen the amount of air entering therein. The conventional fire wall 30 defines the rearward end of the engine compartment, so that cooling air entering from the scoop 26 fills the whole engine compartment and passes forwardly through the inter-cylinder spaces of the engine to pass back to the airstream through the annulus 24. The annulus 24 is so located with respect to the cowling and airstream that it is in a low pressure zone, whereby the low pressure augments cooling air flow through the engine compartment.

An engine accessory, such as an oil cooler 32 may be located within the engine compartment close to the cowling 12, and the cowling has an additional opening 34 formed therein through which air passing through the oil cooler may exhaust to the atmosphere. To adjust the amount of air flow through the oil cooler, a rearwardly facing cover 36 is provided, this cover being adjustable by means of a cable control 38, so that the amount of air passing through the oil cooler may be controlled at the will of the pilot.

This invention comprises improvements over Patent No. 1,511,667, to W. L. Gilmore, the subject invention providing for effective oil temperature control, and utilizing the low pressure zone at the rear edge of the spinner for augmenting cooling air flow past the engine. In the said Gilmore patent, a blower is depended upon to augment cooling air flow, using up additional power and adding complication to the system. The subject invention aims to teach the augmentation of cooling air flow by location of the air exit opening in front of the engine, in a region where external air pressure is relatively low, which phase of operation is not taught by the Gilmore patent.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. In an airplane, in combination, a cowling, an engine wholly enclosed thereby, an air entrance scoop in said cowling rearward of said engine, an annular rearwardly facing air exit opening in said cowling forward of said engine, an engine accessory adapted to be cooled by air, within said cowling and rearward of said engine, said accessory lying close to said cowling, the latter having an opening adjacent said accessory to permit of the flow of air therethrough, and adjustable cover means for said opening by which the air flow past said accessory may be controlled independently of the air flow past said engine, said engine and accessory both receiving air from said air entrance scoop.

2. In aircraft, a compartment containing an engine, air entrance means on one side of said engine, an engine accessory to be cooled mounted in said compartment on the said air entrance side of the engine, adjustable air exit means leading directly from said accessory to the outside air, and a separate exit for air on the other side of the engine.

3. In aircraft, a compartment having an air scoop directed toward the flight stream to entrain air under pressure within said compartment, a plurality of longitudinally spaced air exits, facing away from the flight stream, through which the air in said compartment is released, and a plurality of longitudinally spaced engine components to be cooled, each lying adjacent a different said air exit.

4. In aircraft, in combination, a radial engine mounted at the nose thereof, cowling embracing said engine forming an air-containing compartment rearward thereof, an air scoop in said cowling, rearward of said engine, for entraining air under pressure in said compartment from which cooling air passes forwardly over said engine, means forming an air exit opening forward of said engine, an oil cooler rearward of said engine in said compartment, adapted to be cooled by the air within said compartment, and means providing an individual controllable air exit opening adjacent said oil cooler, in said cowling rearward of said engine, for controlling the air flow over said cooler independently of the air passing over said engine.

WILLARD B. GOODMAN.
WESLEY L. LOSSON.